Oct. 13, 1925.
S. LA BONSKY
1,557,256
PISTON RING
Filed June 16, 1925
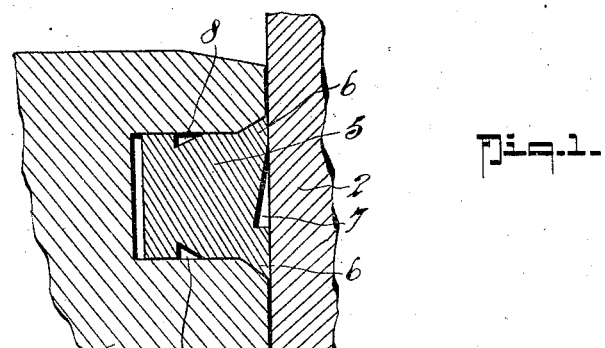
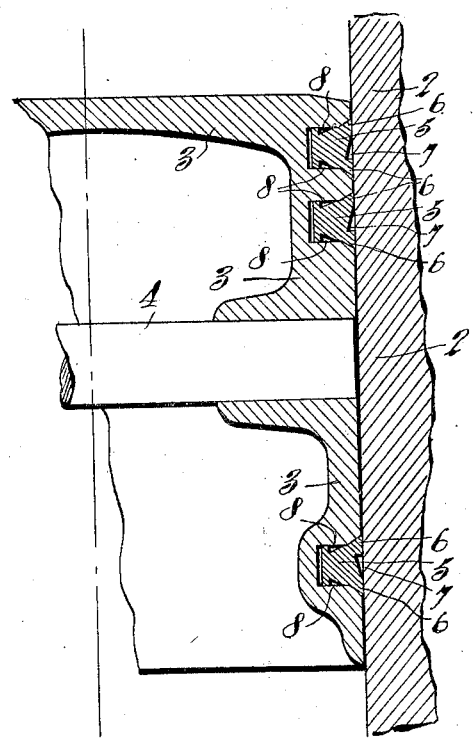
Inventor
Sam La Bonsky
By Albert E Dulinsh
Attorney Patented Oct. 13, 1925.

1,557,256

UNITED STATES PATENT OFFICE.

SAM LA BONSKY, OF VANCOUVER, BRITISH COLUMBIA, CANADA.

PISTON RING.

Application filed June 16, 1925. Serial No. 37,498.

*To all whom it may concern:*

Be it known that I, SAM LA BONSKY, a former subject of the Czar of Russia, but at present without citizenship in any country, residing at Vancouver, in the Province of British Columbia, Canada, have invented certain new and useful Improvements in Piston Rings, of which the following is a specification.

This invention relates to a piston ring for an internal combustion or the like engine where the pressure and temperature and velocity are high and it is desirable to retain the lubricating oil as much as possible within the area of the piston and its rings and prevent any surplus oil passing either outward to the crank case or inward to the combustion end of the cylinder.

The particular means by which these objects are attained are fully set forth in the following specification reference being made to the drawings by which it is accompanied, in which:

Fig. 1 is a section of the piston ring to an enlarged scale, showing its relation to the piston and the inside of the cylinder, and Fig. 2 is a vertical section, to a smaller scale, of one side of the piston showing the position of the rings in relation to the connecting rod pin.

In these drawings 2 represents the wall of the cylinder and 3 that of the piston, 4 being the pin for the connecting rod.

The ring 5, which is the particular subject of this application, has an outwardly bevelled enlargement 6 from each side toward the outer bearing contact of the ring on the cylinder wall, whereby relatively acute edges are offered that will sweep the surplus oil from the cylinder.

In the outer surface of the ring which contacts with the cylinder is an angular groove 7 having a square shoulder toward the pin 4 and angled therefrom outward from the pin, as shown in Fig. 2. This is designed to collect the lubricating oil and retain it where it is required on the ring.

In each side face of the ring which fits within the groove of the piston is a similar angular groove 8, the square shoulder of which is toward the axis of the piston and the other side is outwardly angled therefrom. The groove of the piston is correspondingly shaped to receive the enlargements 6 but otherwise fits the ring closely in the manner to permit of the ring's expansion.

With this construction the strong pressure of the gas or compressed air on the explosive side of the piston engaging the angled faces of 6 tends to expand the ring outward against the wall of the cylinder and the acute edges offered by the enlargement 6 sweep any surplus oil from the wall of the cylinder and retains it where it can effectively lubricate the ring on the cylinder.

The groove 7 forms a channel in which any surplus oil is retained and prevented from passing the piston and the angled side of the groove tends to spread the retained oil on the wall of the cylinder.

The channels 8 also retain the oil in the vicinity of each ring and as with 7 they serve as gas checks into which the gas may expand and thereby baffle leakage past the piston.

Having now particularly described my invention, I hereby declare that what I claim as new and desire to be protected in by Letters Patent, is:

1. A piston ring, the sides of which are parallel throughout the greater part of its thickness and are therefrom angularly enlarged to the outer circle so as to offer acute cutting edges where the ring bears on the cylinder wall, and grooves for retaining a lubricant in the surfaces which contact with the groove of the piston and the wall of the cylinder.

2. A piston ring having an angular groove in each side which contacts with the groove of the piston and with the bore of the cylinder, one side of each groove offering a square shoulder to the inner side of the ring in the sides and toward the pin of the piston in the outer surface.

In testimony whereof I affix my signature.

SAM LA BONSKY.